(12) United States Patent
Zografos et al.

(10) Patent No.: US 10,732,350 B2
(45) Date of Patent: Aug. 4, 2020

(54) PLASMONIC DEVICES AND CIRCUITS

(71) Applicants: IMEC vzw, Leuven (BE); Katholieke Universiteit Leuven, Leuven (BE)

(72) Inventors: Odysseas Zografos, Leuven (BE); Francky Catthoor, Temse (BE); Sourav Dutta, Atlanta, GA (US); Azad Naeemi, Atlanta, GA (US)

(73) Assignees: IMEC vzw, Leuven (BE); Katholiek Universiteit Leuven, Leuven (BE)

( * ) Notice: Subject to any disclaimer, the term of this patent is extended or adjusted under 35 U.S.C. 154(b) by 0 days.

(21) Appl. No.: 16/100,016

(22) Filed: Aug. 9, 2018

(65) Prior Publication Data

US 2019/0064438 A1 Feb. 28, 2019

(30) Foreign Application Priority Data

Aug. 10, 2017 (EP) .................................. 17185726

(51) Int. Cl.
| | | |
|---|---|---|
| *G02B 6/10* | (2006.01) | |
| *G02B 6/122* | (2006.01) | |
| *G01N 21/552* | (2014.01) | |
| *G02B 5/00* | (2006.01) | |
| *G02B 6/125* | (2006.01) | |
| *B82Y 20/00* | (2011.01) | |

(52) U.S. Cl.
CPC ......... *G02B 6/1226* (2013.01); *G01N 21/554* (2013.01); *G02B 5/008* (2013.01); *B82Y 20/00* (2013.01); *G02B 6/125* (2013.01)

(58) Field of Classification Search
CPC ...... B82Y 20/00; G02B 6/10; G02B 6/12007; G02B 6/122; G02B 6/1225; G02B 5/008
See application file for complete search history.

(56) References Cited

U.S. PATENT DOCUMENTS

| | | | | |
|---|---|---|---|---|
| 2005/0058425 A1* | 3/2005 | Berini | ................ | G02B 6/12007 385/147 |
| 2010/0102233 A1* | 4/2010 | Gelmond | ........... | G01N 21/3581 250/341.1 |

FOREIGN PATENT DOCUMENTS

EP 2 369 383 A1 9/2011

OTHER PUBLICATIONS

Doevenspeck et al:,"Design and simulation of plasmonic interference-based majority gate," AIP Advances, American Institute of Physics, vol. 7, No. 6, Jun. 2017, 7 pages.
(Continued)

*Primary Examiner* — Jennifer Doan
(74) *Attorney, Agent, or Firm* — Knobbe, Martens, Olson & Bear, LLP

(57) ABSTRACT

A plasmonic device comprising an odd number of at least three input waveguides and at least one output waveguide is disclosed. In one aspect, the waveguides are adapted for guiding a surface plasmon polariton wave and the input waveguides are connected to the output waveguide at a waveguide junction. The inserted SPP waves have a phase at the waveguide junction which is either a first phase or a second phase. The second phase is shifted over $\pi$ with regard to the first phase and a combined SPP wave at the waveguide junction has a resulting phase wherein the dimensions of the waveguides are such that for different combinations of phases of the inserted waves the combined waves are phase aligned.

19 Claims, 11 Drawing Sheets

(56) References Cited

OTHER PUBLICATIONS

Liu et al: "Novel surface plasmon waveguide for high integration", Optics Express, vol. 13, No. 17, Aug. 2005, 6 pages.
Pan et al: "Optical interferometric logic gates based on metal slot waveguide network realizing whole fundamental logic operations", Optics Express, vol. 21, No. 8, Apr. 2013, 7 pages.
European Search Report dated Mar. 5, 2018, in European Application No. 17185726.1; 9 pages.

* cited by examiner

| $x_1$ | $x_2$ | $x_3$ | $\langle x_1 \wedge x_2 \wedge x_3 \rangle$ |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

FIG. 21

| $x_1$ | $x_2$ | $x_3$ | $S_{\{0,3\}}(x_1,x_2,x_3)$ |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

FIG. 22

PLASMONIC DEVICES AND CIRCUITS

CROSS-REFERENCE TO RELATED APPLICATIONS

This application claims foreign priority to EP 17185726.1, filed Aug. 10, 2017. The contents of each are incorporated by reference herein in its entirety.

BACKGROUND

Field

The disclosed technology relates to logic circuits. More specifically it relates to devices in which logic is implemented using waveguides which are configured for carrying surface plasmon polaritons and to methods for implementing such devices.

Description of the Related Technology

For more than four decades, Moore's law has been the driving force for the silicon industry. However, as the Si CMOS circuits approach their scaling limitations, this trend is eventually going to end at some point in the future. Photonic devices and circuits have been a promising alternative, benefiting mainly from the fast speed and low propagation losses of photons. However, the diffraction limit of light proves to be a showstopper for realizing nanoscale photonic devices as the size of the photonic device approaches the wavelength of light in the material. Surface plasmon polariton (SPP), localized electromagnetic wave coupled to the oscillations of electrons at the interface between a metal and a dielectric, can circumvent this problem by localizing electromagnetic energy in subwavelength regions. Recent advances in the field of plasmonics have witnessed the development of innovative waveguiding schemes and devices. Various kinds of plasmonic boolean logic gates have also been proposed capable of realizing the whole set of fundamental logic gates. However, these CMOS oriented logic gate sets are not necessarily the best ones to reuse for the plasmonic devices.

Photonic technologies already provide data communication with the speed of light and complement the slower but very small electronics. The major issues in current CMOS technology are the interconnect bottleneck and thermal heat management which both may be overcome by employing light in the bottom layers of the circuit. To enable this, optical waveguides and devices must be scaled beyond the diffraction limit of light. This is where plasmonics come into play by providing subwavelength scale confinement while maintaining speeds in the order of the speed of light.

There is still room for improvement in devices in which logic is implemented using waveguides which are configured for carrying surface plasmon polaritons and in methods for implementing such devices.

SUMMARY OF CERTAIN INVENTIVE ASPECTS

It is an object of embodiments of the disclosed technology to provide a good plasmonic circuit and method for producing such a circuit.

The above objective is accomplished by a method and device according to the disclosed technology.

In a first aspect embodiments of the disclosed technology relate to a plasmonic device comprising an odd number of at least three input waveguides and at least one output waveguide, wherein the waveguides are adapted for guiding a surface plasmon polariton wave at an interface between a metal and a dielectric and wherein the at least three input waveguides are connected to the output waveguide at a waveguide junction, and wherein the plasmonic device is configured such that surface plasmon polariton waves can be inserted in the input waveguides to interfere at the waveguide junction in a combined surface plasmon polariton wave, wherein the inserted surface plasmon polariton waves have a phase at the waveguide junction which is either a first phase or a second phase wherein the second phase is shifted over $\pi$ with regard to the first phase. In embodiments of the disclosed technology the combined surface plasmon polariton wave has a resulting phase at the waveguide junction wherein the dimensions of the waveguides are such that surface plasmon polariton waves can be inserted in the input waveguides to interfere in the combined surface plasmon polariton wave at the waveguide junction such that for different combinations of phases of the inserted waves the combined plasmon polariton waves are phase aligned. Where in embodiments of the disclosed technology reference is made to combined surface plasmon polariton waves which are phase aligned reference is made to combined surface plasmon polariton waves of which the resulting phase at the waveguide junction is either the first phase or the second phase wherein the first phase is a predetermined phase and wherein the second phase is shifted over $\pi$ with regard to the first phase. In embodiments of the disclosed technology the combined surface plasmon polariton wave has a resulting phase at the waveguide junction which is the same as the majority of the phases of the inserted surface plasmon polariton waves. It is advantageous that with an odd number of input waveguides destructive interference is prevented. This is not the case with an even number of input waveguides wherein some input combinations will result in complete output destructive interference.

In embodiments of the disclosed technology the plasmonic device is adapted for inserting surface plasmon polariton waves in the input waveguides to interfere in the combined surface plasmon polariton wave at the waveguide junction such that for different combinations of phases of the inserted waves (i.e. the inserted waves having the first phase or the second phase at the waveguide junction) the combined surface plasmon polariton waves are phase aligned.

It is an advantage of embodiments of the disclosed technology that combined surface plasmon polariton waves are obtained which have the information of the input waves encoded in their phase. It is moreover advantageous that by referencing (using well-controlled interference) it is possible to obtain the output's intensity. This is possible because the combined surface plasmon polariton waves are phase aligned for different combinations of phases of the inserted waves.

In embodiments of the disclosed technology binary information is encoded in the phase of the SPP waves. The plasmonic waves can be interfered to produce the majority result based on the information encoded in their phase. In embodiments of the disclosed technology a phase $\varphi$ may correspond with a binary 0 and a phase $\varphi+\pi$ may correspond with binary 1. Binary data may be encoded into the phase of wave packets. Encoding a logic '1' and '0' in phase implies assigning a phase shift of the SPP wave for each of this values. A logic '1' may for example correspond with a phase shift of 0 and a logic '0' may for example correspond with a phase shift of $\pi$.

It is an advantage of embodiments of the disclosed technology that a gate device is created which operates on plasmon polariton waves and which does a majority operation on at least three plasmon polariton waves. Because of this majority gate operation it is possible to build logic circuits using these plasmonic devices. Applying plasmonic computation to implement logic circuits means that these circuits operate at a frequency (around Thz) and ultra-low energy levels that cannot be achieved by their CMOS counterparts.

It is an advantage of embodiments of the disclosed technology that also non-Boolean logic can be implemented.

It is an advantage of embodiments of the disclosed technology that for different combinations of phases of the inserted waves the resulting combined waves are phase aligned.

In embodiments of the disclosed technology the waveguides are comprising a metal/insulator/metal structure or an insulator/metal/insulator structure wherein the waveguides are dimensioned such that, in operation, a first plasmon wave on one metal insulator interface of a waveguide is coupled in terms of phase with a second plasmon wave on an opposite metal insulator interface of the same waveguide.

In embodiments of the disclosed technology the plasmon polariton waves propagate on the interface between the metal and the insulator. If the width is small enough, then the mode that propagates on one interface and the mode that propagates on the opposite interface is the same. In such a waveguide both plasmon polariton waves on opposite interfaces are coupled and therefore move as one wave. In embodiments of the disclosed technology the two coupled plasmon polariton waves may propagate so that the combination seems to propagate in the centre. In other cases the combined plasmon polariton wave may bounce from one side of the waveguide to the opposite side of the waveguide.

It is an advantage of embodiments of the disclosed technology that the widths of the waveguides are chosen such that the waves over the interfaces get not decoupled. Decoupling could for example occur if the widths are increased too much. Decoupling, or mode splitting may for example occur when the width is above 180 nm.

In embodiments of the disclosed technology where the waveguide is an IMI (insulator/metal/insulator) type waveguide, a better propagation of the waves may be achieved than if the waveguide is a MIM (metal/insulator/metal) type waveguide. IMI type waveguides are therefore suitable for longer ranges of propagation. In embodiments of the disclosed technology the thickness of the metal layer is so small that the plasmon waves on opposite interfaces are coupled. MIM type waveguides on the other hand are suitable for smaller devices.

In embodiments of the disclosed technology each input waveguide of a plasmonic device has a length measured along the input waveguide and the lengths of these input waveguides are the same for that plasmonic device.

It is an advantage of embodiments of the disclosed technology that when input waves with the same phase are inserted in the input waveguides, they meet at the waveguide junction with the same phase.

A plasmonic device according to embodiments of the disclosed technology may be adapted for detecting an intensity of the combined surface plasmon polariton wave at the output waveguide of the plasmonic device.

This intensity may be the normalized peak level of the combined surface polariton wave. Thus not only the resulting phase which is the same as the majority of the phases of the inserted surface plasmon polariton waves can be obtained, but a more expressive plasmonic device can be obtained wherein the intensity of the combined surface plasmon polariton wave is detected.

In embodiments of the disclosed technology the obtained intensity may be compared with at least one predefined threshold thus obtaining at least one logic output. In embodiments of the disclosed technology more than one threshold may be used to obtain multi-bit logic gates in a single device.

If the threshold is zero and if an intensity above the threshold corresponds with a logic one and an intensity below the threshold corresponds with a logic zero, the logic output corresponds with a majority operation on the incoming surface plasmon polariton waves. It is thereby advantageous that by selecting another threshold or even more than one threshold other non-Boolean logic operation(s) of the incoming surface plasmon polariton waves can be obtained.

In a second aspect embodiments of the disclosed technology relate to a plasmonic circuit comprising at least a first stage comprising at least one plasmonic device in accordance with embodiments of the disclosed technology. For a plasmonic device of the first stage the input waveguides have a first width and the output waveguide has a second width, wherein the second width is at least twice the first width and smaller than 4 times the first width.

It is an advantage of embodiments of the disclosed technology that when combining more than one wave in a waveguide, the width of the output waveguide is increased so that there is enough mode space (i.e. more modes of the interference can fit into the output waveguide). Depending on the inserted surface plasmon polariton waves (e.g. the inserted surface plasmon polariton waves may have phases corresponding with binary values 111 or they may have phases corresponding with binary values 011) a different output mode is obtained (the combined plasmon polariton wave). It is an advantage of embodiments of the disclosed technology that the output waveguide has a width which is such that the output modes can propagate similarly. Thus these output modes have a coherent phase. It is an advantage of embodiments of the disclosed technology that staging of plasmonic devices is possible because of the coherence of the different output modes.

In embodiments of the disclosed technology the second width is twice the first width. In embodiments of the disclosed technology the second width is smaller than or equal to the first width.

Plasmonic circuits according to embodiments of the disclosed technology may comprise a further stage wherein the further stage comprises at least one plasmonic device in accordance with embodiments of the disclosed technology. In these plasmonic circuits the input waveguide of the plasmonic device in the further stage is connected with an output waveguide of a plasmonic device in a stage directly before the further stage, and the output waveguide of the plasmonic device in the stage directly before the further stage has a width which is equal to the width of the input waveguide of the plasmonic device in the further stage, and the width of an output waveguide of the plasmonic device in the further stage is at least three times the first width.

It is an advantage of embodiments of the disclosed technology that the output of a plasmonic device of one stage is connected with an input of a plasmonic device of the following stage. This allows for example to cascade the combined SPP wave from one stage to the next. It hence also allows to cascade the phase of the combined SPP wave from one stage to the next. In embodiments of the disclosed technology the width of an output waveguide of the plasmonic device in the further stage is three times the first width. It is an advantage of embodiments of the disclosed technology that plasmonic devices can be cascaded to form a more complex plasmonic circuit which allows to implement more complex logic circuitry.

In embodiments of the disclosed technology the input waveguides of a plasmonic device in a further stage are separated by a further pitch, and the plasmonic devices in a stage directly before the further stage comprise a number of input waveguides which are separated by an earlier pitch, wherein the further pitch is equal to the earlier pitch times the number of input waveguides of the plasmonic device in the stage directly before the further stage.

It is an advantage of embodiments of the disclosed technology that the spacing between input waveguides of plasmonic devices is increasing when going to further stages. This allows to make a plasmonic circuit with a plurality of stages.

In embodiments of the disclosed technology the plasmonic circuit comprises a reference waveguide connected with an output waveguide of a plasmonic device in a last stage.

It is an advantage of embodiments of the disclosed technology that a reference wave can be inserted in the reference waveguide and interfere with the wave in the output waveguide. This reference wave should have a known phase. The length of the reference waveguide and the phase of the reference wave can be chosen optimally with regard to the phase of the wave in the output waveguide.

In embodiments of the disclosed technology the plasmonic circuit comprises a detector which is adapted for detecting an intensity of a signal which is obtained after combining a wave in the output waveguide of the plasmonic device in the last stage with a phase coherent signal in the reference waveguide and wherein the detector is adapted for comparing the intensity with a threshold.

It is an advantage of embodiments of the disclosed technology that the intensity can be compared with a threshold. This intensity may be a measure for the normalized peak level of the combined surface polariton wave. It is an advantage of embodiments of the disclosed technology that the phase in the output wave, which is the result of a majority operation, can be detected after interfering the output wave with a reference wave. The output wave may for example have a frequency of a few terahertz. To detect the phase of such a wave, the wave is combined with a reference signal and the intensity of the resulting signal is evaluated. The reference wave may have the same phase $\varphi$ as the output wave. It may for example also have a phase difference of $\pi$ with the output wave. In one output case, the phases of the reference and the output are such that both waves cancel each other and in another output case the phases are such that both waves strengthen. A threshold can be chosen which enables differentiation between the two cases.

A plasmonic circuit in accordance with embodiments of the disclosed technology may be configured for performing an operation on input binary values. The plasmonic circuit comprises an input controller configured for inserting surface plasmon polariton waves into the input waveguides such that phase aligned surface plasmon polariton waves are obtained at the waveguide junction, wherein the phases of the surface plasmon polariton waves are selected such that they correspond with the input binary values according to a conversion scheme. The plasmonic circuit moreover comprises an output controller configured for converting the phase of the combined surface plasmon polariton wave into a resulting binary value according to the conversion scheme.

In embodiments of the disclosed technology the conversion scheme is such that a phase $\varphi$ corresponds with a binary 0 and a phase $\varphi+\pi$ corresponds with a binary 1.

It is an advantage of embodiments of the disclosed technology that plasmonic waveguides (e.g. MIM waveguides) can be used to interfere plasmonic waves and get the majority logic result by encoding bit information into the phase of the plasmon wave. This kind of structure enables both Boolean and non-Boolean logic. The phase encoding may be introduced with the utilization of nanomagnets that interact with the plasmon waves at the inputs of the circuit.

It is an advantage of embodiments of the disclosed technology that the resulting binary value is the same as the majority of the input binary values. This allows to implement logic operations using the plasmonic devices.

In embodiments of the disclosed technology the output controller is configured for obtaining an amplitude of the combined surface plasmon polariton wave.

It is an advantage of embodiments of the disclosed technology that the amplitude of the combined surface polariton wave is indicative for the relative overweight of the majority in the set of input binary values. This is possible because the combined surface polariton waves have phases which are aligned independent of the binary values of the inserted waves.

In a third aspect embodiments of the disclosed technology relate to a method for designing a plasmonic circuit comprising at least a first stage comprising at least one plasmonic device the method comprising: selecting the width and the length of at least three input waveguides and of an output waveguide of at least one plasmonic device of the first stage, forming the at least one plasmonic device of the first stage wherein at least three input waveguides are connected to the output waveguide at a waveguide junction, wherein the length of the input waveguides for the at least one plasmonic device of the first stage measured along the input waveguides are the same for input waveguides of that plasmonic device, wherein for at least one plasmonic device of the first stage the widths are selected such that the input waveguides have a first width and the output waveguide has a second width, wherein the second width is at least twice the first width and smaller than 4 times the first width.

In embodiments of the disclosed technology the method comprises: selecting the width and the length of at least three input waveguides and of an output waveguide of at least one plasmonic device of a further stage, forming the at least one plasmonic device of the further stage wherein at least three input waveguides are connected to the output waveguide at a waveguide junction, and wherein an input waveguide of the plasmonic device in the further stage is connected with an output waveguide of a plasmonic device in a stage directly before the further stage, wherein the length of the input waveguides for the at least one plasmonic device of the further stage measured along the input waveguides are the same for input waveguides of that plasmonic device, wherein for the at least one plasmonic device of the further stage the widths are selected such that the output waveguide of the plasmonic device in the stage directly before the further stage has a width which is equal to the width of the input waveguide of the plasmonic device in the further stage, and wherein the width of an output waveguide of the at least one plasmonic device in the further stage is at least three times the first width.

In embodiments of the disclosed technology the method comprises a step wherein a logic representation is mapped onto a plasmonic circuit, in accordance with embodiments of the disclosed technology, using a logic synthesis approach based on majority inverter graphs.

It is an advantage of embodiments of the disclosed technology that it is possible to design a plasmonic circuit based on the constraints of a plasmonic devices in accordance with embodiments of the disclosed technology. The synthesis may for example be done utilizing different detection thresholds on the gates of the logic network and mapping through a SAT-based methodology.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 21 shows the truth table of a three input plasmonic device with an $E_y$ threshold equal to 0.5.

FIG. 22 shows the truth table of a three input plasmonic device with a first $E_y$ threshold equal to 0.5 and a second $E_y$ threshold equal to −0.5.

DETAILED DESCRIPTION OF CERTAIN ILLUSTRATIVE EMBODIMENTS

Figure 1:
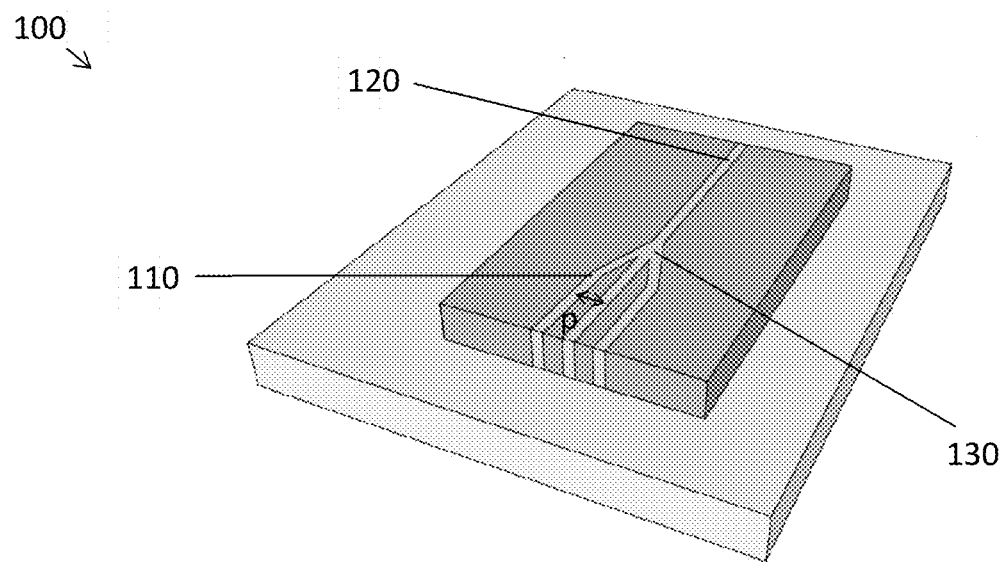
FIG. 1 shows a 3D schematic drawing of a plasmonic device in accordance with embodiments of the disclosed technology.

The disclosed technology will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the disclosed technology, the only relevant components of the device are A and B.

Reference throughout this specification to "one embodiment" or "an embodiment" means that a particular feature, structure or characteristic described in connection with the embodiment is included in at least one embodiment of the disclosed technology. Thus, appearances of the phrases "in one embodiment" or "in an embodiment" in various places throughout this specification are not necessarily all referring to the same embodiment. However, they may refer to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the disclosed technology reference is made to the width of a waveguide reference is made to the separation between the two metal-insulator interfaces.

Figure 5:
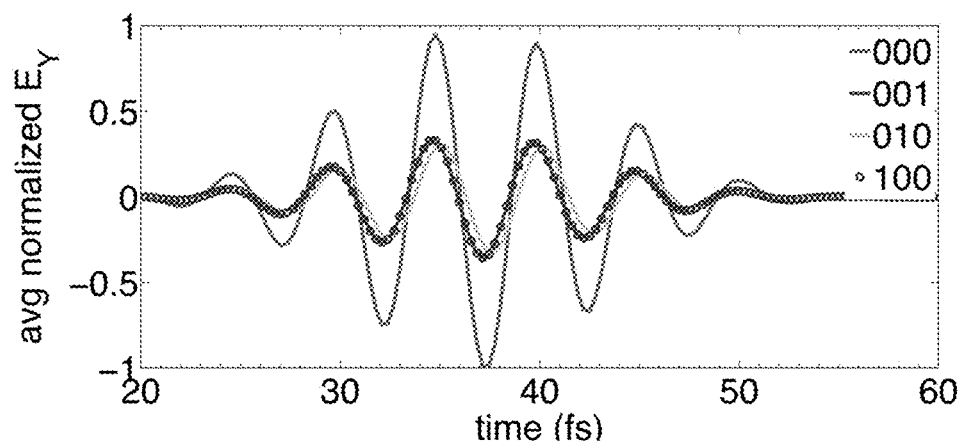
FIG. 5 shows the averaged normalized electric field $E_y$ at the output of a plasmonics majority logic gate device in function of the time (in fs) in accordance with embodiments of the disclosed technology for majority 0 cases.

In a first aspect, embodiments of the disclosed technology relate to a plasmonic device 100 comprising an odd number of at least three input waveguides 110 and at least one output waveguide 120. The waveguides 110, 120 are adapted for guiding a surface plasmon polariton wave at an interface between a metal and a dielectric and the at least three input waveguides are connected to the output waveguide at a waveguide junction 130, and the plasmonic device is configured such that surface plasmon polariton waves can be inserted in the input waveguides to interfere at the waveguide junction in a combined surface plasmon polariton wave, wherein the inserted surface plasmon polariton waves have a phase at the waveguide junction which is either a first phase or a second phase wherein the second phase is shifted over π with regard to the first phase. In embodiments of the disclosed technology the combined surface plasmon polariton wave has a resulting phase at the waveguide junction. In embodiments of the disclosed technology the dimensions of the waveguides are such that surface plasmon polariton waves can be inserted in the input waveguides to interfere in the combined surface plasmon polariton wave at the waveguide junction such that for different combinations of phases of the inserted waves the resulting combined waves are phase aligned. This is illustrated in FIG. 5 which shows combined SPP waves resulting from inserted SPP waves with different binary values. Each of the obtained combined SPP waves are phase aligned. It is an advantage of embodiments of the disclosed technology that for all the different possible combinations of phases of the inserted waves the combined SPP waves are phase aligned.

In embodiments of the disclosed technology the resulting phase is the same as the majority of the phases of the inserted plasmon polariton waves.

FIG. 1 shows a 3D schematic drawing of a plasmonic device 100 in accordance with embodiments of the disclosed technology. It comprises three parallel input metal slot (metal-insulator-metal MIM) waveguides 110 wherein the SPP waves can be excited with the information encoded in the phase of the wave and a combiner region comprising two obtuse angles. The three input waveguides 110 are connected to an output waveguide at a waveguide junction such that the SPP waves can merge into the output waveguide at the waveguide junction. The waveguides may be metal slot waveguides. This has the advantage that a high field confinement capability can be achieved (in nanometers) that aids the designing of nanoscale logic devices. The metal structure may be formed by silver deposited on a $SiO_2$ substrate. In embodiments of the disclosed technology the dielectric may pose a refractive index of 1.5.

The width of the waveguides (in this example the metal slot) may range between 40 nm and 180 nm, minimum value is defined by propagation length and maximum value is defined by mode splitting that would be induced by larger values. The height of the metal slot may range between 80 nm and 120 nm. In this example the width ($w_{in}$, $w_{out}$) and height (h) of the metal slot are 60 nm and 100 nm, respectively.

The operating wavelength may range from 0.6 μm to 1.55 μm, depending on the waveguide material. In this example the surface plasmons are excited at an operating wavelength of 1.55 μm with a frequency of 193 THz to achieve a good trade-off between confinement and propagation loss. The SPP waves travel at the same frequency but with different wavelengths determined by the dispersion relation. For a waveguide width of 60 nm, 120 nm and 180 nm, waves are obtained which are traveling at wavelengths of 860 nm, 1020 nm and 1150 nm respectively.

The waveguides may for example be defined with a resolution of 5 nm for regular straight waveguides and with a resolution of 2 nm or 2.5 nm for the bend regions. Absorbing boundary conditions based on perfectly matched layers (PML) may be used to minimize reflections.

Figure 2:
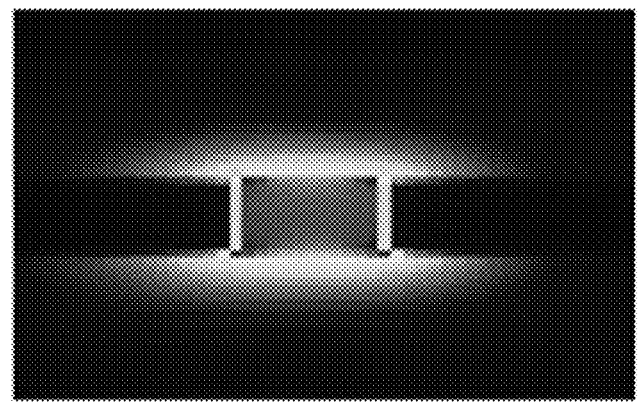
FIG. 2 shows the fundamental mode distribution in an input waveguide in accordance with embodiments of the disclosed technology.

The fundamental mode distribution in the metal slot waveguide is shown in FIG. 2. As can be seen, such a geometry supports deep subwavelength confinement with the electric field confined mainly within the slot. At the chosen wavelength of 60 nm, the waveguide also has a considerable propagation length $L_P$ of 5.31 μm.

The pitch p (i.e. the distance between the centers of neighboring waveguides) is cross-talk limited and can be as low as 100 nm. In the example illustrated in FIG. 1 the pitch p is 360 nm, which corresponds with a coupling length of tens of μm to minimize crosstalk between the parallel waveguides. While increasing the width of the waveguide increases the propagation length, it also demands an increase in the pitch for reducing crosstalk noise.

Figures 3, 4:
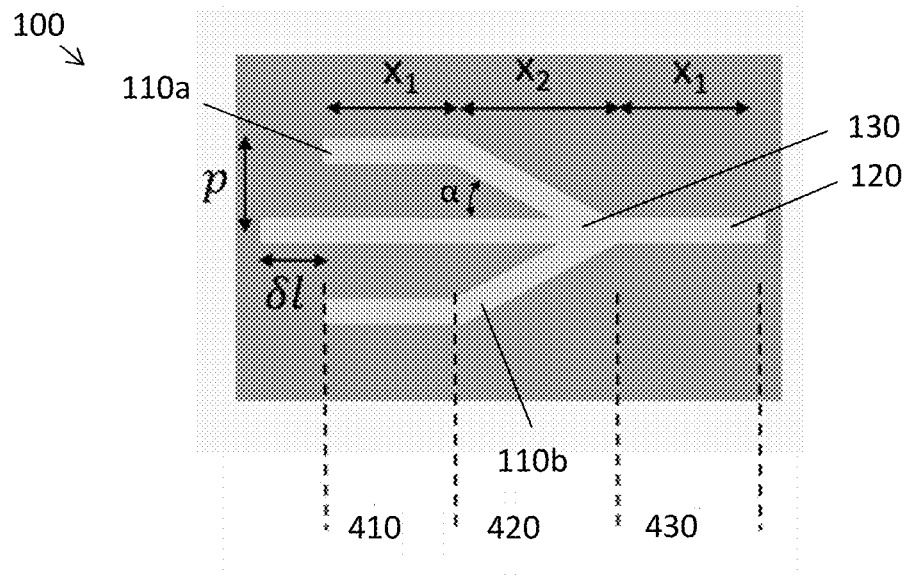
FIG. 3 shows the top view of the plasmonic device of FIG. 1.
FIG. 4 shows the truth table of a three input plasmonic device in accordance with embodiments of the disclosed technology.

FIG. 3 shows the top view of the plasmonic device of FIG. 1. The device comprises an input region 410 wherein the first parts 110a of the input waveguides 110 are parallel with each other, a combiner region 420 wherein second parts 110b of the input waveguides are oriented towards the waveguide junction 130 and an output region 430 comprising the output waveguide 130. The length of the input region and the output region ($x_1$) may range between 100 nm to π/2. They may have the same length or they may have a different length. The length of the input region and/or the output region may for example be 100 nm.

When embodiments of the disclosed technology reference a merging angle, reference is made to the angle between the second parts of two neighboring input waveguides. The merging angle α in the combiner region may for example be between 10° and 90° to ensure smooth merging of the waveguides with minimum loss and crosstalk. As shown in FIG. 3, a small merging angle of 35° between the waveguides is selected. In this example this corresponds to a 500 nm long combiner region ($x_2$). In embodiments of the disclosed technology, the angles between the first and second part of the input waveguides are obtuse angles.

In embodiments of the disclosed technology, the input waveguides 110 comprise a first part 110a. The first parts 110a are thereby parallel with each other. The input waveguides 110 furthermore comprise a second part 110b, wherein the second part 110b interconnects the first part 110a of a plasmonic device 100 with the waveguide junction 130 of the plasmonic device 130. The second parts 110b of a plasmonic device in a further stage have a further interconnect length measured parallel with the first parts and the plasmonic devices in a stage directly before the further stage have an earlier interconnect length measured parallel with the first parts. The further interconnect length is equal to the earlier interconnect length times the number of input waveguides of the plasmonic device in the stage directly before the further stage.

In embodiments of the disclosed technology the second parts interconnecting the first parts with the waveguide junction may have a preferred orientation with regard to the orientation of the first parts. It is an advantage of embodiments of the disclosed technology that this preferred orientation can be maintained for plasmonic devices in the different stages. This achieved by enlarging the interconnect length, measured along the direction of the first parts, proportional with the pitch, from stage to stage.

When SPP waves are inserted in the three input waveguides 110, the three input waveguides will inject power into a single output waveguide 130. This may result in a considerable backflow due to reflection from the waveguide junction 130. The transmission may be improved by impedance matching.

At wavelengths considerably longer than the size of the structure the quasi-static approximation where the waveguides are equivalent to transmission lines with some characteristic impedance may be used for designing the plasmonic device. Following the approach highlighted in "Cai, W., et al., Elements for Plasmonic Nanocircuits with Three-Dimensional Slot Waveguides. Advanced materials, 2010. 22(45): p. 5120-5124." for 3-D waveguides, the direct integrals for the transverse electromagnetic fields may be calculated to evaluate the effective voltage $v=\int_{-\infty}^{+\infty} E_y d_y$ and current $I=\int_{-\infty}^{+\infty} H_z d_z$ and hence the equivalent impedance $$Z = \frac{v}{I}.$$

For impedance matching, the gap width, also referred to as the width, of the output waveguide is increased. It is an advantage of embodiments of the disclosed technology that that the transmitted power through the 3 input junction increases with the increase in the gap width of the output waveguide. However, to avoid mode splitting and a huge increase in the required pitch for the next stage, the output gap width is preferably below 200 nm, or even below 180 nm, the output gap width may for example be 120 nm.

The SPP wave propagating through the two side arms of the plasmonic device have to cover an extra distance introduced due to the bends. To compensate for this path difference δl and to make all the three inputs equal in phase and strength, in the example illustrated in FIG. 3, the input of the middle input waveguide is shifted to the left by a distance $$\delta l = \left( \frac{p}{\sin\left[\tan^{-1}\left(\frac{p}{x_2}\right)\right]} - x_2 \right).$$

In embodiments of the disclosed technology the plasmonic device is a plasmonic majority gate device. The working principle of the plasmonic majority gate device is based on its majority voting capability. A majority gate with n number of inputs return a true output if and only if more than half of its inputs are true. The truth table of a three input majority gate is shown in FIG. 4. Note that the majority gate also has the capability to perform an AND or OR operation if one of the inputs (input 1 in this table) is used as a control input. This allows to effectively map many arithmetic functions, even when they cannot be directly matched well to just a cascaded majority logic structure. An input combination of (1,1,1), e.g. corresponding to all the SPP waves having a phase ϕ according to a conversion scheme, gives rise to maximum constructive interference resulting in a high amplitude output with the phase ϕ, i.e., a strong 1. On the other hand, for input combination (1,1,0), two of the SPP waves having phase ϕ and ϕ+π undergo destructive interference resulting in a weak logic 1. Hence, such a wave based majority logic gate, in accordance with embodiments of the disclosed technology, has the capability to distinguish between a strong and a weak majority in addition to the boolean output of logic 1 and 0. This paves the way for performing non-boolean computation for pattern recognition as will be shown next.

Waveguide geometries such as metal-insulator-metal (MIM) provide relatively good confinement at small propagation lengths due to the fast electric field decay in the metal. Opposite to MIM waveguides are insulator-metal-insulator (IMI) geometries which yield very long propagation lengths at relatively poor confinement. Both type of waveguides may be used in plasmonic devices according to embodiments of the disclosed technology.

The following metals may for example be used Ag, W, Au, Ta, and the following insulators may for example be used, $SiO_2$, $Al_2O_3$, TiN.

In a second aspect embodiments of the disclosed technology relate to a plasmonic circuit 200 comprising at least a first stage 210 comprising at least one plasmonic device 100 in accordance with embodiments of the disclosed technology, wherein for a plasmonic device 100 of the first stage 210 the input waveguides have a first width and the output waveguide has a second width, wherein the second width is at least twice the first width and smaller than or equal to 4 times the first width or even smaller than or equal to 3 times the first width. In embodiments of the disclosed technology the second width may for example be equal to twice the first width.

FIG. 5 shows the output of a plasmonics majority logic gate device in accordance with embodiments of the disclosed technology for majority 0 cases. The gap width of the input waveguide of the plasmonic device was 60 nm and the gap width of the output waveguide of the plasmonic device was 120 nm. The results for majority 1 show the exact opposite output and is not shown in the figure. As can be seen from this figure the resulting binary value of the phase of the combined SPP wave is the same as the majority of the binary values of the phases of the inserted plasmon polariton waves. Moreover, it can be seen that for different combinations of phases of the inserted waves the resulting combined waves are phase aligned.

Note that the output of the plasmonic device has four different levels denoting a combination of boolean output 1 and 0 and the strength of the majority. In order to utilize such a majority gate for boolean computation, one may renormalize the output before feeding it to the next stage.

Figure 6:
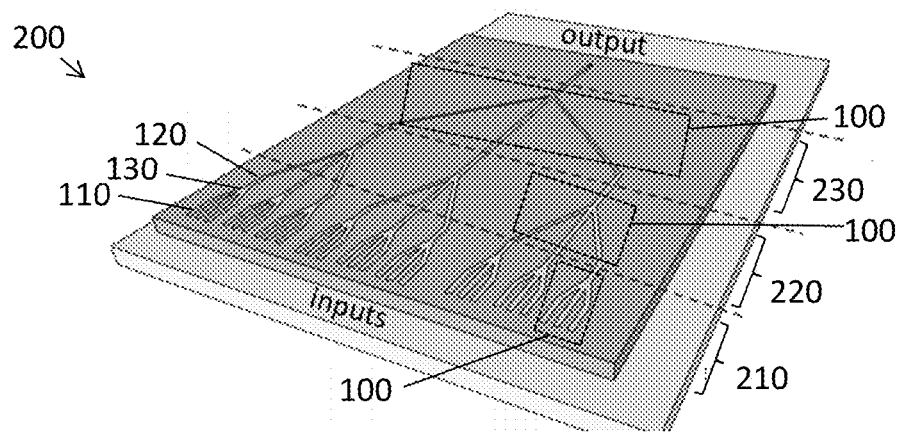
FIG. 6 shows a schematic drawing of a 3 stage cascaded plasmonic circuit comprising a plurality of input waveguides and one output waveguide in accordance with embodiments of the disclosed technology.

However, in embodiments of the disclosed technology this multi-level output may be used for non-boolean computing. An illustration of a 3-stage cascaded plasmonic circuit is shown in FIG. 6. Since each stage performs the dual functionality of boolean output and strength of majority, the overall final result will display the boolean output 1 or 0 depending on the majority of all the inputs while the strength of the output amplitude will indicate how many of the total number of inputs were 1 or 0.

Figure 7:
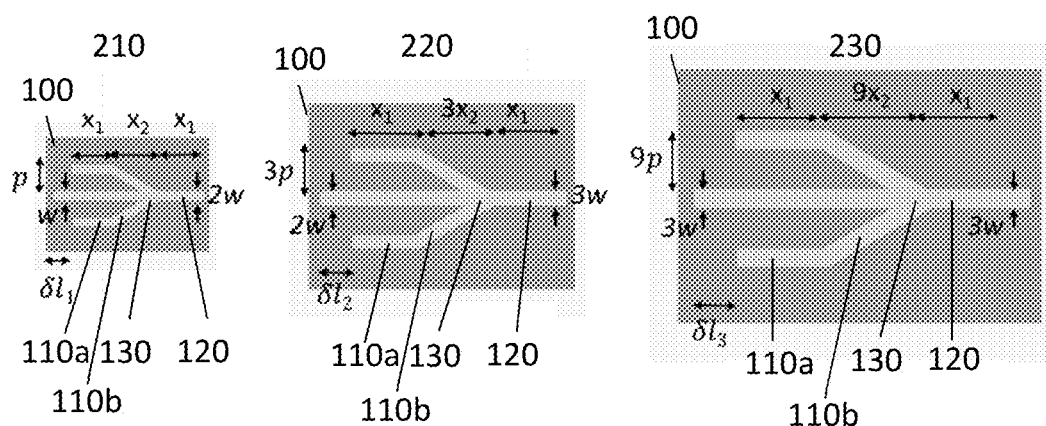
FIG. 7 shows schematic drawings of plasmonic devices for different stages in a plasmonic circuit in accordance with embodiments of the disclosed technology.

The plasmonic circuit of FIG. 6 may comprise plasmonic devices as illustrated in FIG. 7 showing from left to right a plasmonic device for the first stage 210, the second stage 220, and the third stage 230.

In these examples, the pitch follows a scaling of p, 3p and 9p. To keep the same small merging angle of 35° between the input waveguides also, the length of the combiner region ($x_2$) is scaled accordingly. Note that due to the increase in the length of bends, the path difference ($\delta l_1$, $\delta l_2$ and $\delta l_3$) at each stage has to be considered separately and should be adjusted in the middle input waveguide. For improved transmission via impedance matching, the widths of the waveguides at each stage are chosen as w (e.g. 60 nm), 2w and 3w respectively, wherein w is the width of the input waveguide at the first stage, 2w is the width of the output waveguide at the first stage and the width of the input waveguide at the second stage, 3w is the width of the output waveguide at the second stage and the width of the input waveguide at the third stage. In this exemplary embodiment of the disclosed technology the maximum width of the waveguide is limited to 3w since beyond 3w (=180 nm), the coupled MIM mode tends to split.

It is moreover advantageous that via the increase in widths at each stage the propagation length of the SPP wave is increasing. In the example of FIG. 6 and FIG. 7, the propagation length increases from 5.3 µm in the first stage to 8.46 µm in the second and 10.76 µm in the third. This proves to be beneficial since the overall size of the plasmonic device increases from one stage to the next.

The distance between the stages (i.e. the sum of the length of the output waveguide of one stage and the length of the first part of the input waveguide of the next stage) is preferably minimized to avoid propagation loss. The distance between the stages may for example range between 100 nm and 200 nm. The distance however cannot be too small since the mode has to be well formed after the plasmons interfere at the junction.

Figure 8:
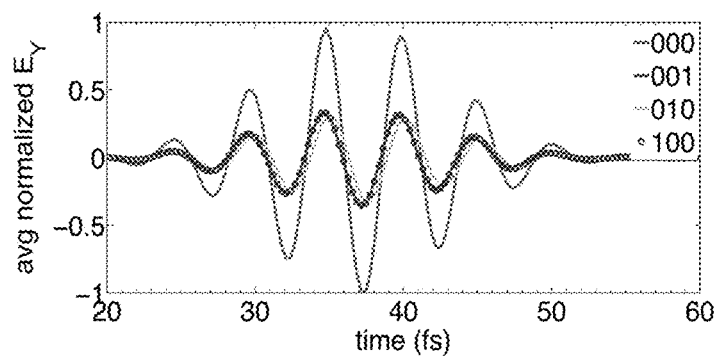
FIGS. 8 to 10 shows the normalized electric field at the output of plasmonics majority logic gate devices in different stages in a plasmonic circuit in accordance with embodiments of the disclosed technology.
Figure 9:
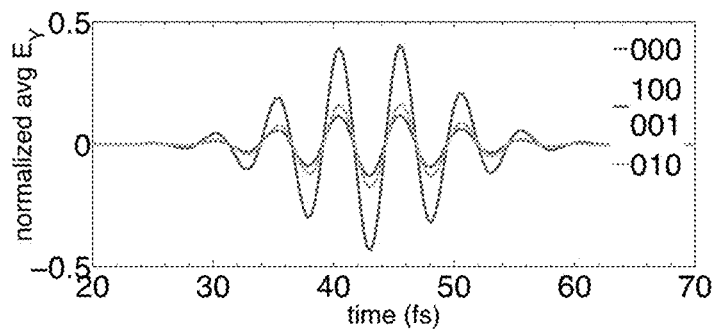
Figure 10:
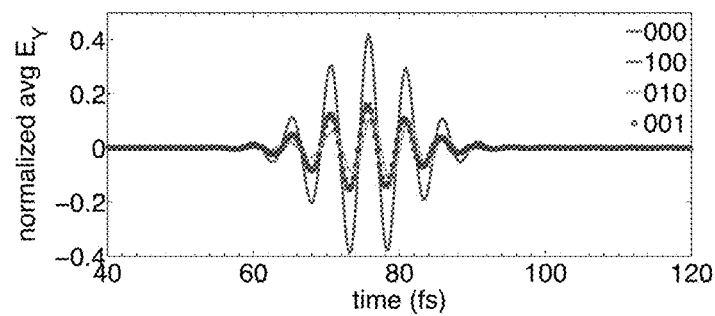

FIG. 8 (first stage; the gap width of the input waveguide is 60 nm and the gap width of the output waveguide is 120 nm), 9 (second stage; the gap width of the input waveguide is 120 nm and the gap width of the output waveguide is 180 nm) and 10 (third stage; the gap width of the input waveguide is 180 nm and the gap width of the output waveguide is 180 nm) highlight the proper plasmonic device functionality of each stage with the same input excitation for majority 0 cases. The results for majority 1 show the exact opposite output and is not shown in the figures. As can be seen from this figure the resulting binary value of the phase of the combined SPP wave is the same as the majority of the binary values of the phases of the inserted plasmon polariton waves. Moreover, also from these figures it can be seen that for different combinations of phases of the inserted waves the resulting combined waves are phase aligned.

Figure 11:
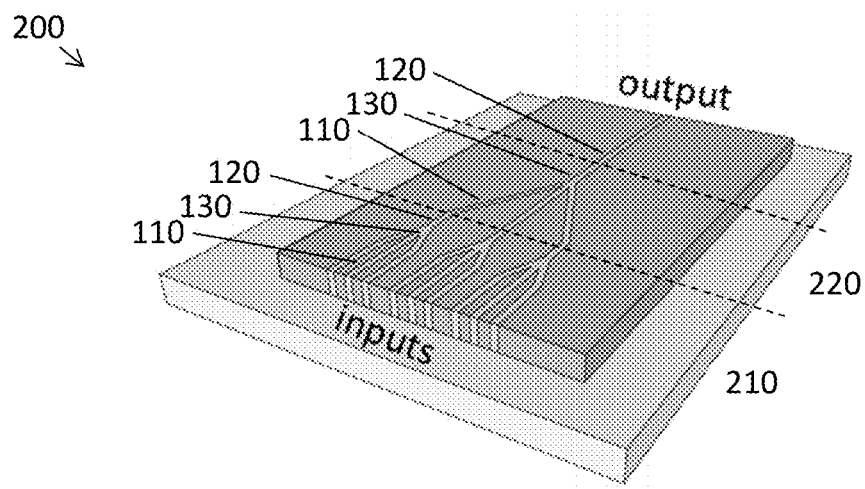
FIG. 11 shows a plasmonic circuit comprising a two stage cascaded structure comprising a plurality of input waveguides and one output waveguide in accordance with embodiments of the disclosed technology.

FIG. 11 shows a plasmonic circuit 200 comprising a two stage cascaded plasmonic device structure in accordance with embodiments of the disclosed technology. The same design rules are used as illustrated in FIG. 7.

Figure 12:
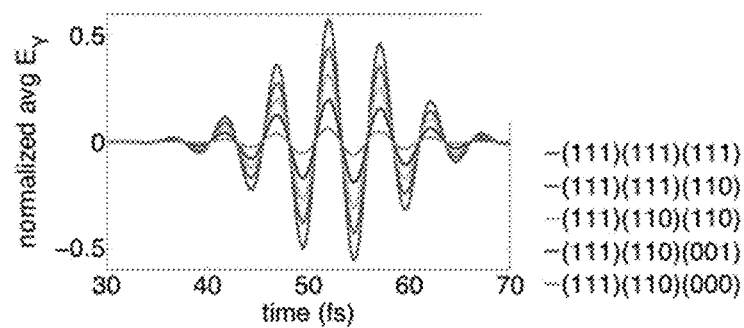
FIG. 12 shows the output of the second stage of a plasmonic circuit when exciting the nine inputs with the same stimulus in terms of power and signal amplitude but with different phases.

FIG. 12 shows the output of the second stage when exciting the nine inputs with the same stimulus in terms of power and signal amplitude with phase either $\phi$ or $\phi+\pi$ (the gap width of the input waveguide of the first stage is 60 nm and the gap width of the output waveguide of the first stage is 120 nm, the gap width of the input waveguide of the second stage is 120 nm and the gap width of the output waveguide is second stage is 180 nm). The output of the second stage is shown for the five possible scenarios where the majority of the inputs is a logic 1 (has phase $\phi$). Firstly, all the five outputs have the same phase $\phi$, thus giving a boolean output of logic 1 and verifying the correct functionality of the cascaded plasmonic devices. Secondly, five different levels of output amplitude are obtained, each corresponding to the strength of the majority of the input. A strong majority where all the nine inputs have the same phase $\phi$ produces the highest output amplitude. Likewise, a weak majority where only five inputs have phase $\phi$ while the remaining four have phase $\phi+\pi$ produces the lowest output amplitude. The results for the majority of the inputs being a logic 0 show the exact opposite output and is not shown in the figure.

Figure 13:
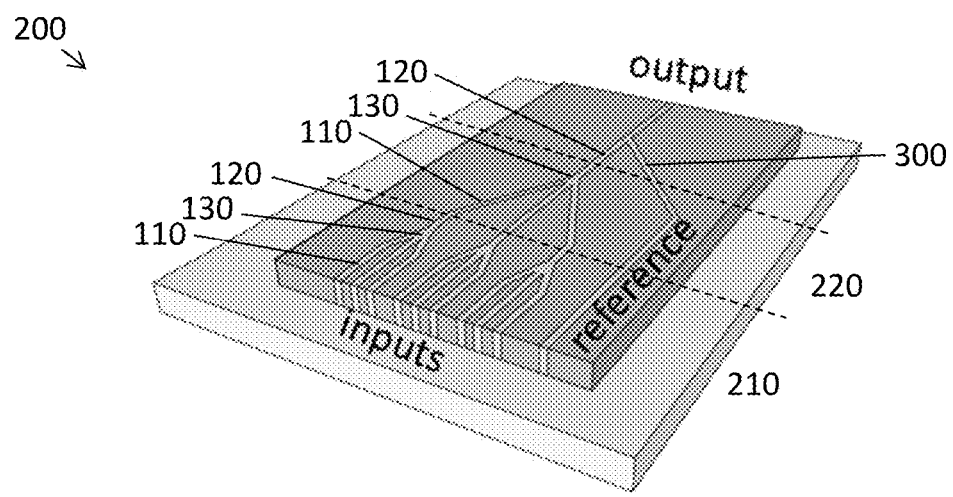
FIG. 13 shows a plasmonic circuit comprising a two stage cascaded structure and a reference waveguide in accordance with embodiments of the disclosed technology.

Unlike in the analogous spin wave logic operating in GHz where one can do a phase-detection, it is extremely difficult to devise such a scheme in plasmonic logic operating in THz. Therefore plasmonic circuits according to embodiments of the disclosed technology may comprise a reference waveguide 300 connected with an output waveguide 120 of a plasmonic device in a last stage. An example thereof is shown in FIG. 13. It is an advantage of embodiments of the disclosed technology that such a reference waveguide allows to extract both the amplitude and phase information from the output. A reference signal can be inserted in the reference waveguide. This reference signal merges, in this example, at the output of the second stage. For the reference waveguide the same design technique may be used in terms of choosing the pitch and the bend length. The pitch and width may for example scale with the stage whereas the merging angle does not and stays at 35°. The amplitude and the phase of the incoming reference signal may be adjusted (via higher excitation power and location of the excitation) to match the second stage output for the case of a strong majority logic 1 (all inputs 1) in the two stage cascaded system. In embodiments of the disclosed technology the phase of the reference signal may be controlled so that it matches with the second stage output. This may be obtained by taking into consideration the path lengths for SPP waves inserted in an input waveguide and the path length of a signal inserted in the reference waveguide. In embodiments of the disclosed technology the amplitude of the reference signal is chosen such that it is greater than that of the output amplitude (at the output waveguide where the reference waveguide is connected) for a strong majority.

Figure 14:
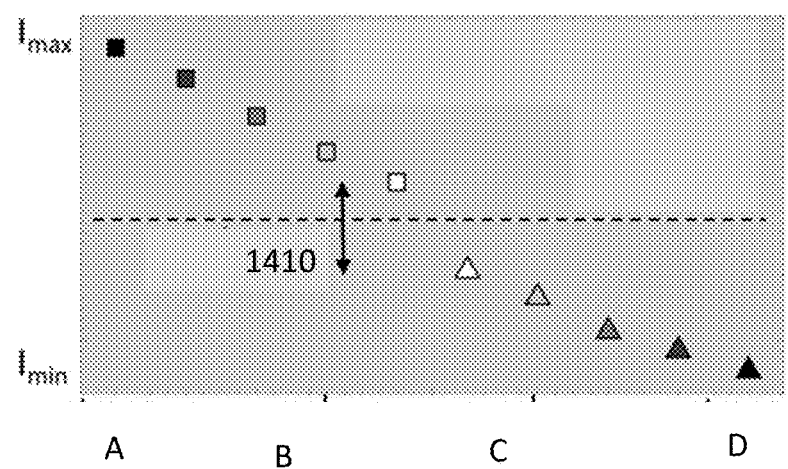
FIG. 14 shows the output of a 2-stage circuit comprising a reference waveguide in accordance with embodiments of the disclosed technology.

For the scenario of a strong majority logic 1 (scenario A), the output of the second stage of the cascaded structure interferes constructively with the reference signal giving rise to the maximum output intensity. For the other extreme case of a strong majority logic 0 (scenario D), a complete destructive interference produces a very weak output intensity. Scenario B corresponds with a weak majority logic 1 and scenario C corresponds with a weak majority logic 0. FIG. 14 illustrates the analog-type output one can obtain via this referencing technique. In embodiments of the disclosed technology a threshold level may be defined such that if the output intensity is above the threshold the resulting binary value is considered a logic 1, while if the output intensity is below the threshold the resulting binary value is considered a logic 0 (this threshold is represented by the horizontal dashed line in FIG. 14). The spacing between the weak majority logic 0 and the weak majority logic 1 is represented by the arrow 1410 and is the resolution. In embodiments of the disclosed technology the deviation of the output intensity from the threshold level may be measured. This deviation denotes the strength of the majority output (strong vs. weak).

While it is highly desired to have a multi-staged cascaded plasmonic logic without back-and-forth signal conversion between plasmon and charge domain, the propagation loss of SPP waves puts a limitation on the number of feasible cascaded stages. In the example of FIG. 7, the size of the plasmonic device increases with the number of stages from an estimated value of 0.636 um$^2$ for the first stage to 4.66 um$^2$ and 38.24 um$^2$ for the second and third stage, respectively. The increase in the path-length travelled by the SPP compared to the propagation length $L_P$ increases the transmission loss to more than 50% in the third stage. Therefore, in embodiments of the disclosed technology amplifiers may be present to boost the signal amplitude or to convert the plasmonic signal to a voltage signal at the end of the third stage.

Figure 15:
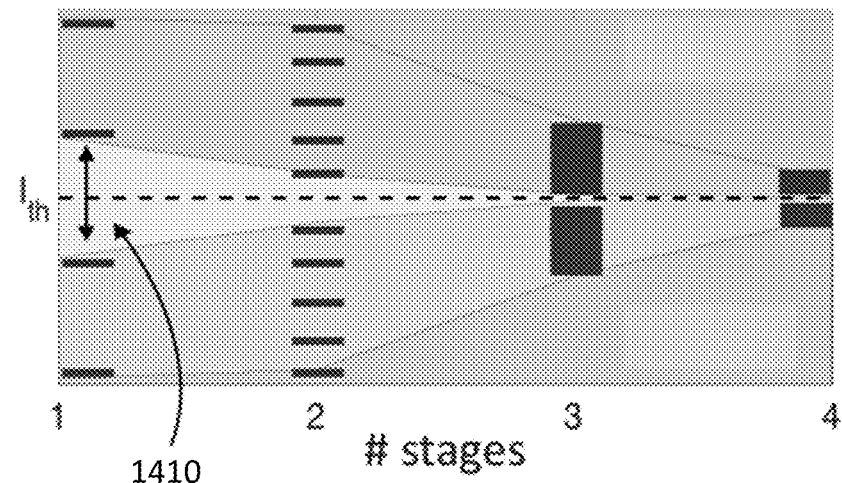
FIG. 15 shows the range of output intensities for logic 1 or 0 obtained at the end of each stage of a circuit in accordance with embodiments of the disclosed technology.

An additional constraint for the number of output stages comes from the output level distinction after referencing. The number of degenerate output levels increases with the number of stages and input, from 4 in $1^{st}$ stage to 10 in the $2^{nd}$ and so on. FIG. 15 shows the range of output intensities for logic 1 or 0 obtained at the end of each stage. The vertical axis corresponds with the output intensity and the horizontal dashed line corresponds with the intensity threshold ($I_{th}$). In this example, intensities above the intensity threshold correspond with logic 1 and intensities below the intensity threshold correspond with logic 0. Note that the range of output intensities for both logic 1 or 0 decreases due the propagation loss from one stage to the next. Hence, even though the referencing technique will still produce the analog-type output intensity, it will be difficult to separate or distinguish between the outputs for logic 1 and 0 as they get closer to the threshold level (case of weak majority).

Figure 16:
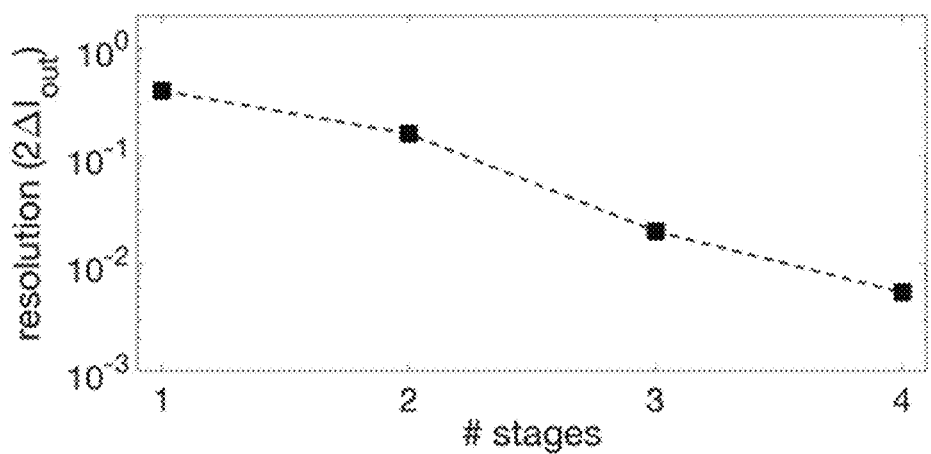
FIG. 16 shows the resolution denoting the number of states for logic 1 and 0 above and below the threshold level as function of the number of stages, in accordance with embodiments of the disclosed technology.

This is also illustrated in FIG. 16 wherein the possibility of separation of states above and below the threshold level (belonging to logic 1 and 0) is illustrated by plotting the resolution as a function of the number of stages. The resolution is defined as the difference between the minimum output intensity for logic 1 and the maximum output intensity for logic 0 (case of weak majority outputs), resolution=$2\Delta I_{out}$, where $\Delta I_{out}=I_{min}^{logic\ 1}-I_{max}^{logic\ 0}$.

In embodiments of the disclosed technology wherein the reference signal has been adjusted to have a phase ϕ, all the input combinations having majority of the input as logic 1, i.e., SPP waves having a phase ϕ, result in a constructive interference while all majority 0 cases having phase ϕ+π it result in destructive interference.

In embodiments of the disclosed technology where the amplitude of the reference signal is set higher than all the other 9 inputs, a boolean output of logic 1 for all the 10 cases (output SPP waves having phase ϕ), but with varying levels of the output amplitude of the electric field component $E_Y$.

Because of their extremely high throughput, plasmonic circuits according to embodiments of the disclosed technology may prove particularly useful in highly parallel real-time signal processing applications.

Figure 17:
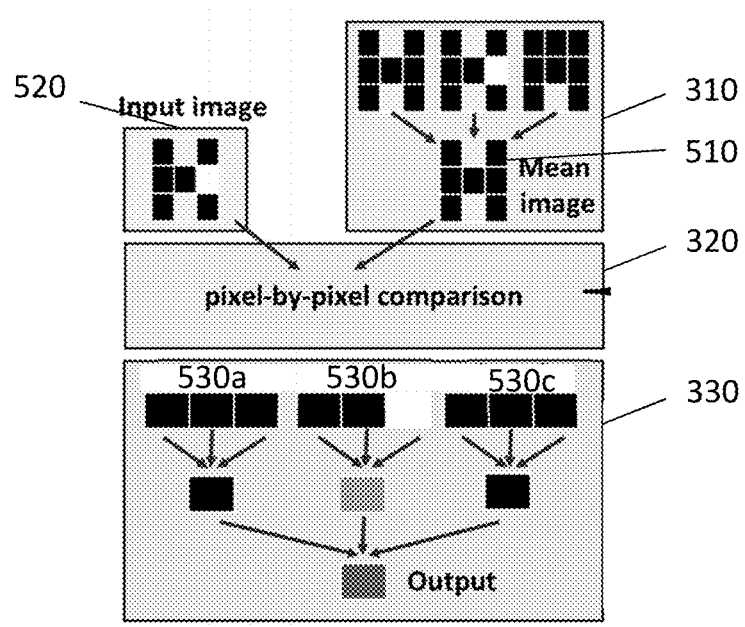
FIG. 17 illustrates a typical pattern recognition scheme of which part can be executed using plasmonic circuits in accordance with embodiments of the disclosed technology.

An example of this is used to illustrate the concept, namely a pattern recognition system. A typical pattern recognition system consists of two major phases of operation: the learning phase 310 and the detection phase. The learning phase involves storage of a desired pattern in the memory. This involves training the circuit by providing numerous "mainly similar" images which are in reality different representations of the same target image. A so-called "mean image" 510 is constructed from all these given similar images. The detection phase involves two major tasks. The first task involves a pixel-by-pixel comparison 320 between the input image 520 and the mean image 510. The second is the non-boolean decision making process 330 involving counting the number of matches and mismatches and determining the degree of match or mismatch between the input and the reference image (by a pixel-by-pixel comparison). FIG. 17 illustrates a typical pattern recognition scheme. A recent proposal on non-boolean pattern recognition has demonstrated the usage of All-Spin Logic (ASL) to perform all the three tasks (Aghasi, H., et al., Smart Detector Cell: A Scalable All-Spin Circuit for Low Power Non-Boolean Pattern Recognition. IEEE Transactions on Nanotechnology, 2016. 15(3): p. 356-366). The training and decision making blocks are designed utilizing ASL majority gates while the comparator is realized via an ASL XNOR gate. While it provides an exciting scheme for low power computing compared to its CMOS counterpart, the operating time is still in nanoseconds. A hybrid spintronics-plasmonics computing platform may be envisioned where one can perform the training operation 310 in the Spintronics domain, non-boolean decision making 330 (on row1 530$a$, row2 530$b$ and row 3 530$c$) in the plasmonics domain and comparison 320 at the overlap between the two as shown in FIG. 17.

Spintronics, due to their inherent non-volatile feature, enables storing large sets of training images within the logic with no standby power dissipation. It is an advantage that plasmonic circuits according to embodiments of the disclosed technology can be used for non-boolean decision making as they can work in terahertz due to their extremely high throughput. The comparator may be realized by utilizing the newly developed concept of magneto-plasmonics (Temnov, V. V., et al., Active magneto-plasmonics in hybrid metal-ferromagnet structures. Nature Photonics, 2010. 4(2): p. 107-111), which also serves as a transducer of data from spin-to-plasmonics domain.

Magneto-plasmonics involve manipulation of the properties of electron plasma and consequently the surface plasmon-polariton (SPP) propagating at the interface of a metal and a dielectric (MI) via application of a magnetic field by introducing a thin layer of ferromagnet exhibiting large magneto-optical (MO) effect in the metal layer. Particularly, the configuration of the magnetic field applied parallel to the interface and perpendicular to the propagating SPP gives rise to a modulation of the wave vector while maintaining its transverse magnetic (TM) nature. Similar effects can be achieved in a metal-insulator-metal (MIM) waveguide with added layers of cobalt. Interestingly, the sign of the modulation of the wave vector $\Delta k$ changes under the application of the same magnetic field depending on the location of the Co layer in the top or bottom metallic cladding. As such, the presence of Co layer in both the top and bottom metallic cladding will give rise to a net $\Delta k$ if and only if the magnetization of the two Co layers are oppositely oriented. One can utilize this as a magneto-plasmonics comparator.

Figure 18:
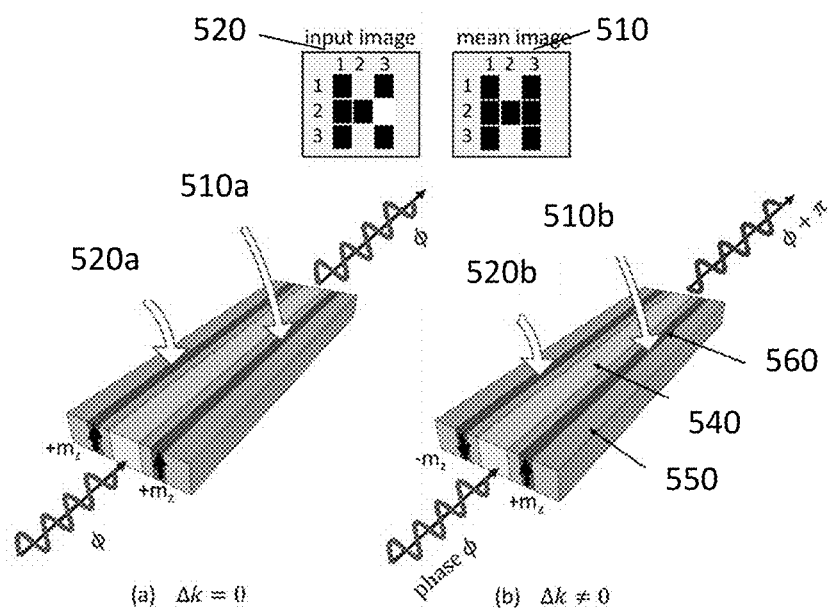
FIG. 18 illustrates the working principle of a magneto-plasmonic based comparator.

The working principle of a magneto-plasmonic based comparator for a pattern recognition system is illustrated in FIG. 18.

Figure 19:
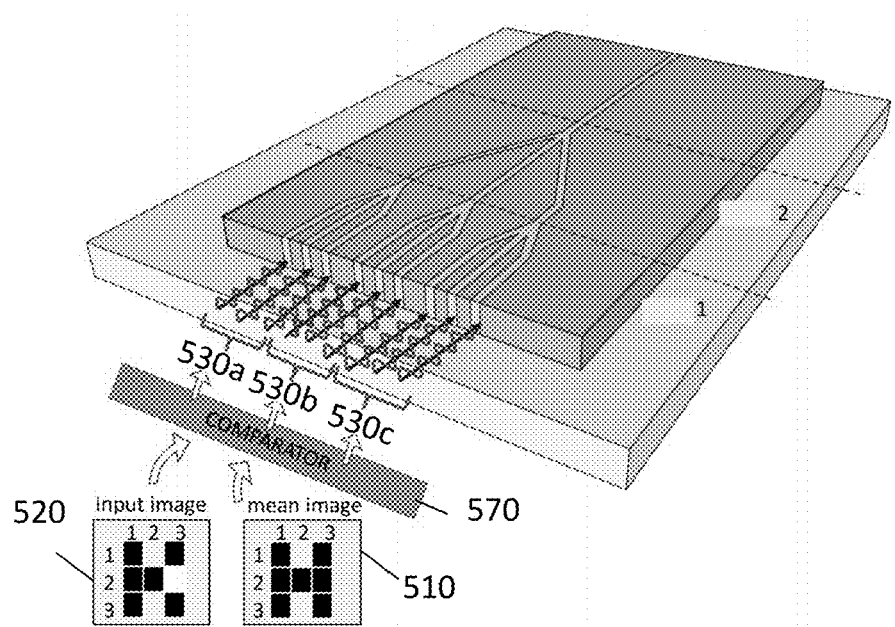
FIG. 19 shows how a non-boolean pattern decision making process can be based on a plasmonic circuit in accordance with embodiments of the disclosed technology.

For non-boolean decision making using a plasmonic device in accordance with embodiments of the disclosed technology, the images (input and mean image) may be considered as binary valued matrices with the black and white pixels represented as "1" and "0", respectively. After performing the learning operation with ASL, the data from the mean image's pixel is written into one of the Co layers 560 (via spin current or equivalent method) and the data of the input image's pixel is written into the other ferromagnet (for example pixel (1,1) 520a of the input image and pixel (1,1) of the input image 510a for the left drawing, and pixel (2,3) of the input image 520b and pixel (2,3) of the input image 510b for the right drawing). As the excited SPP (with initial phase ϕ) propagates through the MIM waveguide sandwiched by the Co layers 560, a match between the input and mean pixel, i.e. the same orientation of the two magnets, gives rise to a zero Δk while a mismatch gives rise to a net Δk. The metal 550 is Ag, the insulator is a dielectric 1.5 540. The Δk change manifests itself as a change in the phase Δϕ=Δkl of the SPP accumulated over a distance l. When considering the phase of the propagating SPP wave as the state variable with logic 1 or 0 encoded in the phase of the wave, a phase ϕ same as the initial phase is denoted as logic 1 indicating a match (FIG. 18 (a)), while a phase ϕ+π represents logic 0 indicating a mismatch (FIG. 18 (a)). Note that the pixel-by-pixel comparison using magneto-plasmonics shown in FIG. 18 can happen in parallel for all 9 pixels of the 3×3 image and the output (match or mismatch) is feed row-wise into the 3-input cascaded plasmonic devices as depicted in FIG. 19. A mean image 510 and input image 520 are fed to a comparator 570 which has output for row 1, 2, and 3 530a, 530b, 530c. Using the majority voting capability of the gate, the number of match or mismatch can be counted at each stage with the final output portraying whether there is a match or mismatch between the input and the reference image and the degree of match or mismatch found. Hence, a strong match between the input and reference pattern would be interpreted by an output say "99% match found", while a weak match would read as "20% match found".

It is an advantage of embodiments of the disclosed technology that besides boolean logic, plasmonics circuits according to embodiments of the disclosed technology are also capable of performing non-boolean computing. Due to the extremely high throughput of plasmonics, the proposed scheme can be of immense advantage in high throughput low latency signal processing applications which are arithmetic dominated with strict timing requirements, like a pattern recognition system. Also, the chosen metal slot waveguide structure has extremely high field confinement capability (22 nm), thus proving to be a promising option for on-chip integration.

Embodiments of the disclosed technology relate to a method for designing a plasmonic circuit in accordance with embodiments of the disclosed technology. Such a method may comprise a step for mapping a logic representation onto a plasmonic circuit. The mapping may be done using a synthesis based on majority inverter graphs (for MIG see "L. Amarú, P.-E. Gaillardon, and G. De Micheli, Majority-Inverter Graph, in Proc. 51st Annu. Des. Autom. Conf.—DAC '14 (ACM Press, New York, N.Y., USA, 2014) pp. 1-6."). It is an advantage of embodiments of the disclosed technology that the properties of wave computing can be exploited since majority gates and inverters emerge naturally from straightforward structures used in wave computing.

More specifically there are two wave computing properties that can be exploited to map different application functionalities. The first is the exploitation of the detection threshold that can be applied at the output of each plasmonic gate. The second is the combination of two cascaded 3-input majority structures to create a 5-input structure.

Figure 20:
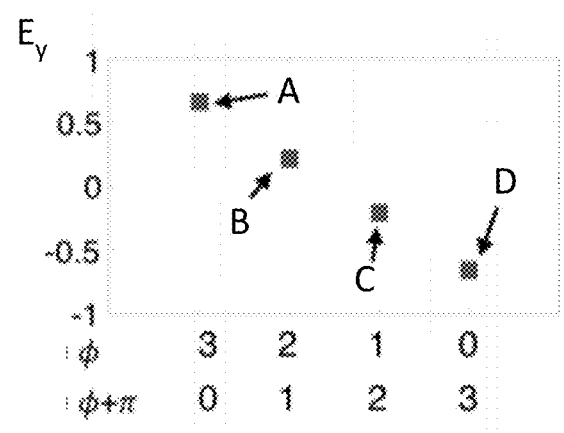
FIG. 20 shows the normalized peak output of an exemplary plasmonic device in accordance with embodiments of the disclosed technology.

FIG. 20 shows the normalized peak output of an exemplary plasmonic device in accordance with embodiments of the disclosed technology and this for different inputs (the x-axis represents the number of inputs with phase φ and the number of inputs with phase φ+π). In this example, four different peak output levels $E_y$ can be obtained for the 3 input plasmonic device. In the graph output level A corresponds with a strong majority 1, output level B corresponds with a weak majority 1, output level C corresponds with a weak majority 0 and output level D corresponds with a strong majority 0). In embodiments of the disclosed technology, the intensity of the combined surface plasmon polariton wave is compared with a predefined threshold. The intensity may for example be the normalized peak output $E_y$ and the predefined threshold may in that case be referred to as the $E_y$ threshold. If the $E_y$ threshold is 0, the three input plasmonic device behaves as a three input majority. In other words, everything that is below 0 is considered a logic 0, while everything that is above is a logic 1, disregarding the strength of the peak. In the example illustrated in FIG. 20 input combinations (1,1,1), (1,1,0), (1,0,1), and (0,1,1) produce logic 1, while input combinations (0,0,0), (0,0,1), (0,1,0), and (0,0,1) lead to logic 0. The table in FIG. 4 shows the truth table of the majority operation of three inputs $x_1$, $x_2$, $x_3$.

Other functions can be obtained using a 3-input plasmonic device if a different $E_y$ threshold level is considered. For instance, an $E_y$ threshold equal to 0.5 means that everything that is above 0.5 can be considered a logic 1, while everything below is a logic 0. In this situation, only the (1,1,1) input combination leads to a logic 1, while all other seven combinations lead to a 0. The corresponding truth table is shown in the table in FIG. 21. In this case, the 3 input function implemented by the plasmonic device is a 3 input AND gate. In the same way, an $E_y$ threshold equal to −0.5 leads to a 3 input OR function; and an $E_y$ threshold equal to 1 or −1 produce the constant functions 0 and 1, respectively.

Thus, different threshold functions can be obtained with a 3 input plasmonic device, if different $E_y$ threshold levels are considered in accordance with embodiments of the disclosed technology. A threshold function is a function that is true if and only if the sum of the weighted inputs is greater than or equal to a threshold value T:

$$f(x_1 \ldots x_n) = [w_1 x_1 + \ldots + w_n x_n \geq T] \quad (1)$$

where $w_1 \ldots w_n$ are the weights and T is the threshold value. In the following [$w_1, \ldots, w_n$; T] is used as shorthand notation for (1). It follows that the three input plasmonic device can produce the functions [1,1,1;0], [1,1,1;1], [1,1,1;2], [1,1,1;3], and [1,1,1;4]. [1,1,1;2] is the 3 input majority function; [1,1,1;0] and [1,1,1;4] are logic 1 and 0 respectively, and [1,1,1;1] and [1,1,1;3] are the three input OR and AND.

Two different $E_y$ thresholds can also be considered. As an example, consider a 3 input function that is true if the $E_y$ peak is above the 0.5 level or below the −0.5 level, and it is false in the middle of the two threshold levels. The truth table is shown in the table in FIG. 22: the function is 1 if the number of ones in each input combination is zero or three. Functions for which the output value is decided by the number of ones in the input combination, as the one described above, are called symmetric functions. In the following, the shorthand notation $S_{\{c_1, c_2, \ldots, c_k\}}(x_1, \ldots, x_n)$ is used for a symmetric function of n inputs that is true if $c_1$, or $c_2$, or ... $c_k$ inputs are 1. For instance, $S_{\{1,3\}}(x_1, x_2, x_3)$ is a 3 input symmetric function that is true if the input combination has one or three 1s. The notation $S_{[c_1,c_2]}(x_1, x_2, x_3)$ is to represent logic functions that are true for each input combination that has a number of is between $c_1$ and $c_2$. For example, $S_{[1,3]}(x_1, x_2, x_3)$ is true for the input combinations that have one, two, or three inputs that are 1. Using these notations, the table in FIG. 23 corresponds to the function $S_{\{0,3\}}(x_1, x_2, x_3)$.

All threshold functions with unitary weights are symmetric functions. For instance $[1,1,1;2]=S_{[T,n]}(x_1, x_2, x_3)=S_{[2,3]}(x_1, x_2, x_3)$, being T the threshold value and n the number of inputs. It follows that, with a 3 input plasmonic device, the following symmetric functions can be realized using one $E_y$ threshold level: $S_{[0,3]}(x_1, x_2, x_3)$, $S_{[1,3]}(x_1, x_2, x_3)$, $S_{[2,3]}(x_1, x_2, x_3)$, $S_{\{3\}}(x_1, x_2, x_3)$, $S_{\{\ \}}(x_1, x_2, x_3)$. If two $E_y$ threshold levels can be employed, the symmetric functions can be represented as $S_{\{0,3\}}(x_1, x_2, x_3)$, $S_{\{1,2\}}(x_1, x_2, x_3)$, $S_{\{0,2,3\}}(x_1, x_2, x_3)$, and all the threshold functions obtained with one $E_y$ threshold level. As a general rule, consider two $E_y$ threshold levels $t_1$ and $t_2$, a 3 input plasmonic device can represent all symmetric functions $S_{[0,t_1]}(x_1, x_2, x_3)+S_{[t_2,n]}(x_1, x_2, x_3)$ and all functions $S_{[t_1,t_2]}(x_1, x_2, x_3)$, where n is the number of inputs and $t_1$ and $t_2$ are numbers between 0 and n, being $t_1 \leq t_2$.

In embodiments of the disclosed technology mapping logic to a plasmonic circuit may be done by exploiting the fact that a 5-input gate can be constructed based on the structure of FIG. 11, wherein the first and the third plasmonic devices are used as single inputs.

The 5 input plasmonic device follows a similar behavior. In the following is demonstrated that a 5 input plasmonic device with a $E_y$ threshold equal to 0 produces a five input majority, i.e., [1,1,1,1,1;3]. Also in this case, one $E_y$ threshold produces different functions: [1,1,1,1,1;0], [1,1,1,1,1;1], [1,1,1,1,1;2], [1,1,1,1,1;3], [1,1,1,1,1;4], [1,1,1,1,1;5], and [1,1,1,1,1;6]. [1,1,1,1,1;1] and [1,1,1,1,1;5] represent 5 input OR and AND, respectively. These correspond to the 5-input symmetric functions: $S_{[0,5]}(x_1, x_2, x_3, x_4, x_5)$, $S_{[1,5]}(x_1, x_2, x_3, x_4, x_5)$, $S_{[2,5]}(x_1, x_2, x_3, x_4, x_5)$, $S_{[3,5]}(x_1, x_2, x_3, x_4, x_5)$, $S_{[4,5]}(x_1, x_2, x_3, x_4, x_5)$, $S_{\{5\}}(x_1, x_2, x_3, x_4, x_5)$, $S_{\{\ \}}(x_1, x_2, x_3, x_4, x_5)$.

Analogously, for the two $E_y$ threshold levels all functions $S_{[0,t_1]}(x_1, x_2, x_3, x_4, x_5)+S_{[t_2,n]}(x_1, x_2, x_3, x_4, x_5)$ and all functions $S_{[t_1,t_2]}(x_1, x_2, x_3, x_4, x_5)$ can be represented.

It is an advantage of embodiments of the disclosed technology that plasmonic devices in accordance with embodiments of the disclosed technology are more expressive than majority gates, since they can implement not only majority but also other functions. It is worth noting that an $E_y$ threshold equal to 0 leads to a smaller energy consumption, while higher $E_y$ threshold levels produce higher energies. For the two $E_y$ thresholds implementation, two output detectors are necessary. Also in this case, the higher expressive power of plasmonic device comes with a cost.

Figure 23:
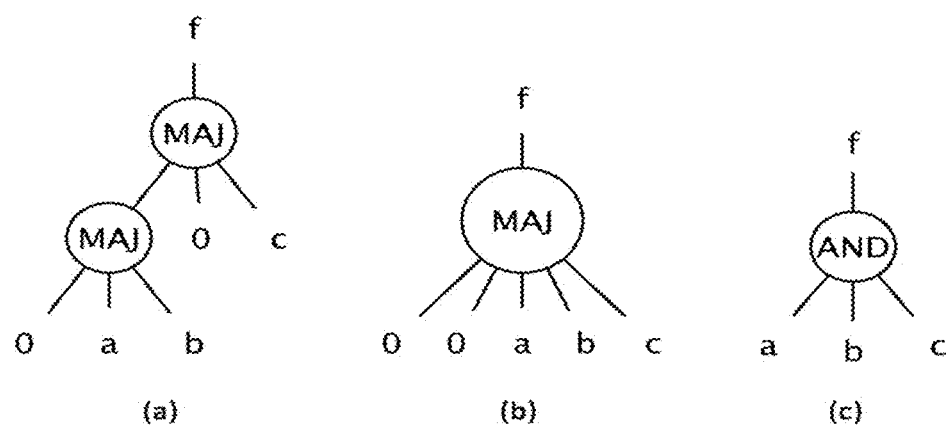
FIG. 23 shows different networks for 3-input AND function.

FIG. 23 shows different networks for 3-input AND function. FIG. 23a shows a 3 input AND function obtained using only 3-input majority gates. Two gates and two levels are necessary, but all 3-input plasmonic devices have an $E_y$ threshold level equal to 0. The same function can be built using one 5-input device (FIG. 23b) with an $E_y$ threshold level at 0 (majority 5), or also using one 3-input device with an $E_y$ threshold level at 0.5 (FIG. 23c).

Embodiments of the disclosed technology comprise a logic synthesis framework which allows to effectively express basic logic functions and enable cost-efficient mapping of application functionalities on the basic functions. For that purpose, conventional synthesis frameworks are not suitable.

In embodiments of the disclosed technology the implementation of Boolean functions and logic circuits is addressed using plasmonic technology. As previously discussed, plasmonic devices can be cascaded up to a maximum number of stages (e.g. between 3 and 5 stages); further, each device allows a maximum given fan-out (e.g. between 3 and 5). Logic synthesis and optimization tools in accordance with embodiments of the disclosed technology take into consideration all plasmonic device constraints.

A prior art method that considers logic synthesis with respect to technological constraints has been described in Testa (E. Testa, M. Soeken, O. Zografos, F. Catthoor, G. De Micheli. "Exact Synthesis For Logic Synthesis Applications With Complex Constraints. IWLS, 2017). In this work a SAT-based method is used to produce majority-based networks that can be mapped using devices with restricted fan-out (maximum fan-out=3) and depth (maximum depth=3). Some significant extensions can be added to the algorithm and data structure of such a SAT based method in order to map networks into plasmonic devices. First, more and different constraints need to be considered. A synthesis tool according to embodiments of the disclosed technology considers both a limited depth (i.e. the number of stages) and a limited number of fan-out values. These may for example range from 2 up to 5. Further, 3-input plasmonic devices can implement not only the majority-of-three function, but also the 3-input AND and OR function. In addition, plasmonic devices in the first level are less expensive in terms of area and delay as compared to ones in the last level. Some important changes to the underlying data structure (being MIGs) and algorithms are then needed in order to consider the new functionality.

As previously discussed, a 3 input plasmonic device can represent different symmetric functions, depending on the two $E_y$ threshold levels considered. These gate functions are addressed by the synthesis tool, plus different cost functions are taken into account for each plasmonic device depending on its level. Also the 5-input symmetric functions that are implemented with plasmonic devices (see previous logic mapping part) are taken into consideration by the synthesis tool.

Due to the plasmonic technological constraints, new solutions are addressed in order to be able to support large functions. In embodiments of the disclosed technology this is achieved using a partitioning method.

In embodiments of the disclosed technology large functions are supported by partitioning them into smaller ones, where each of these small functions meet the given constraints of plasmonic devices and plasmonic circuits. Testa illustrates partitioning of large functions into smaller ones. In Testa the results are based on 3-input functions mapping and it appears that 100% of 3-input functions for the considered networks can be realized with fan-out and depth restricted to 3. It is an advantage of plasmonic devices according to embodiments of the disclosed technology that they have higher expressive power for each plasmonic device.

In embodiments of the disclosed technology a large function, e.g. a logic network N is mapped into plasmonic circuit by the following steps:
1. Enumerate all the subcircuits of N that can be implemented with the given constraints of the plasmonic devices.
2. Obtain the best cover composed of enumerated subcircuits.
3. Optimize the mapped network.

Several methods for enumerating cuts, for creating subcircuits, have been proposed (see, A. Neutzling, J. M. Matos, A. I. Reis, R. P. Ribas, and A. Mishchenko. Threshold logic synthesis based on cut pruning. *ICCAD*, pages 494-499, 2015). However, in those methods cuts are enumerated based on the number of inputs in the cut. This method is not sufficient for mapping logic into a plasmonic circuit in accordance with embodiments of the disclosed technology as in embodiments of the disclosed technology it is required to enumerating cuts that represent functions which can be implemented with respect to the given constraints. In embodiments of the disclosed technology, the subcircuits are selected such that they can be handled by a SAT-based synthesis method.

Also, several methods for finding a cover composed of cuts have been proposed. However, the underlying cost metrics to these methods target area (number of cuts) or delay (longest path in the mapped network). In embodiments of the disclosed technology, the mapping algorithm addresses the constraints imposed by the plasmonic circuit, which is not addressed by any existing algorithm.

The final step considers to post-optimize the mapping. This step contains possible cut merging for boundary optimization. When cuts are expanded in their networks using the SAT-based synthesis method, those logic gates at the boundary of the cuts that become redundant can be reduced. In embodiments of the disclosed technology step 2 and 3 from the algorithm may be carried out in one step.

While certain embodiments of the disclosed technology have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A plasmonic circuit comprising:
a plurality of plasmonic devices each comprising an odd number of at least three input waveguides and at least one output waveguide,
wherein the waveguides are adapted for guiding a surface plasmon polariton wave at an interface between a metal and a dielectric,
wherein the at least three input waveguides are connected to the output waveguide at a waveguide junction, and wherein the plasmonic device is configured such that surface plasmon polariton waves inserted in the input waveguides interfere at the waveguide junction in a combined surface plasmon polariton wave, wherein the inserted surface plasmon polariton waves have a phase at the waveguide junction which is either a first phase or a second phase wherein the second phase is shifted over $\pi$ with regard to the first phase, and
wherein the plasmonic devices are arranged in cascaded stages, wherein output waveguides of one or more plasmonic devices of a first stage serve as input waveguides of one or more plasmonic devices of a further stage cascaded from the first stage.

2. The plasmonic circuit of claim 1, wherein the waveguides comprise a metal/insulator/metal structure or an insulator/metal/insulator structure, and wherein the waveguides are dimensioned such that, in operation, a first plasmon wave on one metal insulator interface of a waveguide is coupled in terms of phase with a second plasmon wave on an opposite metal insulator interface of the same waveguide.

3. The plasmonic circuit of claim 1, wherein each input waveguide has a same length measured along the input waveguide.

4. The plasmonic circuit of claim 1, wherein the plasmonic circuit is adapted for detecting an intensity of the combined surface plasmon polariton wave at the output waveguide of one of the plasmonic devices.

5. The plasmonic circuit of claim 4, wherein the plasmonic circuit is adapted for comparing the obtained intensity with at least one predefined threshold thus obtaining at least one logic output.

6. The plasmonic circuit of claim 1,
wherein the input waveguides of the first stage have a first width and the output waveguide of the first stage has a second width, wherein the second width is at least twice the first width and smaller than 4 times the first width.

7. The plasmonic circuit of claim 6, wherein an input waveguide of the one or more plasmonic devices in the further stage is connected with an output waveguide of a plasmonic device in a stage directly before the further stage, wherein the output waveguide of the plasmonic device in the stage directly before the further stage has a width which is equal to the width of the input waveguide of the one or more plasmonic devices in the further stage, and wherein the width of an output waveguide of the one or more plasmonic devices in the further stage is at least three times the first width.

8. The plasmonic circuit of claim 7, wherein the input waveguides of the one or more plasmonic devices in the further stage are separated by a further pitch, and wherein the plasmonic device in the stage directly before the further stage comprises a number of input waveguides which are separated by an earlier pitch, wherein the further pitch is equal to the earlier pitch times the number of input waveguides of the plasmonic device in the stage directly before the further stage.

9. The plasmonic circuit of claim 6, wherein the plasmonic device further comprises a reference waveguide connected with an output waveguide of a plasmonic device in a last stage.

10. A plasmonic circuit comprising:
a plurality of plasmonic devices each comprising:
an odd number of at least three input waveguides and at least one output waveguide,
wherein the waveguides are adapted for guiding a surface plasmon polariton wave at an interface between a metal and a dielectric, and
wherein the at least three input waveguides are connected to the output waveguide at a waveguide junction, and wherein the plasmonic device is configured such that surface plasmon polariton waves inserted in the input waveguides interfere at the waveguide junction in a combined surface plasmon polariton wave, wherein the inserted surface plasmon polariton waves have a phase at the waveguide junction which is either a first phase or a second phase wherein the second phase is shifted over $\pi$ with regard to the first phase;

a first stage comprising at least one of the plasmonic devices, wherein the input waveguides of the first stage have a first width and the output waveguide of the first stage has a second width, wherein the second width is at least twice the first width and smaller than 4 times the first width;

a reference waveguide connected with an output waveguide of one of the plasmonic devices in a last stage; and a detector which is adapted for detecting an intensity of a signal which is obtained after combining a wave in the output waveguide of the plasmonic device in the last stage with a phase coherent signal in the reference waveguide and wherein the detector is adapted for comparing the intensity with a threshold.

11. A plasmonic circuit comprising:

a plurality of plasmonic devices each comprising:
an odd number of at least three input waveguides and at least one output waveguide,
wherein the waveguides are adapted for guiding a surface plasmon polariton wave at an interface between a metal and a dielectric, and
wherein the at least three input waveguides are connected to the output waveguide at a waveguide junction, and wherein the plasmonic device is configured such that surface plasmon polariton waves inserted in the input waveguides interfere at the waveguide junction in a combined surface plasmon polariton wave, wherein the inserted surface plasmon polariton waves have a phase at the waveguide junction which is either a first phase or a second phase wherein the second phase is shifted over $\pi$ with regard to the first phase;

at least a first stage comprising at least one of the plasmonic devices, wherein the input waveguides of the first stage have a first width and the output waveguide of the first stage has a second width, wherein the second width is at least twice the first width and smaller than 4 times the first width;

an input controller configured to insert surface plasmon polariton waves into the input waveguides such that phase aligned surface plasmon polariton waves are obtained at the waveguide junction, wherein the phases of the surface plasmon polariton waves are selected such that they correspond with the input binary values according to a conversion scheme; and an output controller configured to convert the phase of the combined surface plasmon polariton wave into a resulting binary value according to the conversion scheme, wherein the plasmonic device is configured to perform an operation on input binary values.

12. The plasmonic circuit of claim 11, wherein the output controller is configured for obtaining an amplitude of the combined surface plasmon polariton wave.

13. A method of designing a plasmonic circuit, the method comprising:

providing the plasmonic circuit of claim 6;

selecting the width and the length of at least three input waveguides and of the output waveguide of at least one plasmonic device of the first stage; and forming the at least one plasmonic device of the first stage wherein at least three input waveguides are connected to the output waveguide at a waveguide junction, wherein the length of the input waveguides for the at least one plasmonic device of the first stage measured along the input waveguides are the same for input waveguides of that plasmonic device, and wherein for at least one plasmonic device of the first stage the widths are selected such that the input waveguides have a first width and the output waveguide has a second width, wherein the second width is at least twice the first width and smaller than 4 times the first width.

14. The method of claim 13, further comprising:

selecting the width and the length of at least three input waveguides and of an output waveguide of at least one plasmonic device of a further stage; and forming the at least one plasmonic device of the further stage wherein at least three input waveguides are connected to the output waveguide at a waveguide junction, and wherein an input waveguide of the plasmonic device in the further stage is connected with an output waveguide of a plasmonic device in a stage directly before the further stage, wherein the length of the input waveguides for the at least one plasmonic device of the further stage measured along the input waveguides are the same for input waveguides of that plasmonic device, and wherein for the at least one plasmonic device of the further stage the widths are selected such that the output waveguide of the plasmonic device in the stage directly before the further stage has a width which is equal to the width of the input waveguide of the plasmonic device in the further stage, and wherein the width of an output waveguide of the at least one plasmonic device in the further stage is at least three times the first width.

15. The method of claim 13, further comprising a step wherein a logic representation is mapped onto the plasmonic circuit using a synthesis based on majority inverter graphs.

16. The plasmonic circuit of claim 10, wherein the waveguides comprise a metal/insulator/metal structure or an insulator/metal/insulator structure, and wherein the waveguides are dimensioned such that, in operation, a first plasmon wave on one metal insulator interface of a waveguide is coupled in terms of phase with a second plasmon wave on an opposite metal insulator interface of the same waveguide.

17. The plasmonic circuit of claim 10, wherein each input waveguide has the same length measured along the input waveguide.

18. The plasmonic circuit of claim 11, wherein the waveguides comprise a metal/insulator/metal structure or an insulator/metal/insulator structure, and wherein the waveguides are dimensioned such that, in operation, a first plasmon wave on one metal insulator interface of a waveguide is coupled in terms of phase with a second plasmon wave on an opposite metal insulator interface of the same waveguide.

19. The plasmonic circuit of claim 11, wherein each input waveguide has the same length measured along the input waveguide.

* * * * *

UNITED STATES PATENT AND TRADEMARK OFFICE
CERTIFICATE OF CORRECTION

PATENT NO. : 10,732,350 B2
APPLICATION NO. : 16/100016
DATED : August 4, 2020
INVENTOR(S) : Odysseas Zografos It is certified that error appears in the above-identified patent and that said Letters Patent is hereby corrected as shown below:

On the Title Page

In Column 1, Item (73), Line 1, under Assignees, delete "Katholiek" and insert --Katholieke--.

In the Specification

In Column 10, Line 59, delete "$\pi/2$." and insert --$\lambda/2$.--.

In Column 11, Lines 57-58, delete "that that" and insert --that--.

In Column 15, Lines 59-60, delete "it result" and insert --result--.

In Column 15, Line 65, delete "$E_Y$" and insert --$E_y$--.

In Column 18, Line 20, delete "0)." and insert --0.--.

In Column 19, Line 11, delete "is" and insert --1s--.

In the Claims

In Column 22, Line 12, delete "metal insulator" and insert --metal-insulator--.

In Column 22, Line 14, delete "metal insulator" and insert --metal-insulator--.

Signed and Sealed this
Tenth Day of November, 2020

Andrei Iancu
*Director of the United States Patent and Trademark Office*